Dec. 10, 1929. P. G. ANDRES Re. 17,515

SOUND REPRODUCING UNIT

Original Filed Dec. 18, 1926

Inventor:
Paul G. Andres
By: Wallace R. Lane.
Atty.

Reissued Dec. 10, 1929 Re. 17,515

UNITED STATES PATENT OFFICE

PAUL G. ANDRES, OF LA GRANGE, ILLINOIS, ASSIGNOR, BY MESNE ASSIGNMENTS, TO UNITED REPRODUCERS CORPORATION, OF ST. CHARLES, ILLINOIS, A CORPORATION OF NEW JERSEY

SOUND-REPRODUCING UNIT

Original No. 1,655,403, dated January 10, 1928, Serial No. 155,600, filed December 18, 1926. Application for reissue filed September 14, 1928. Serial No. 306,017.

The present invention relates to sound reproducing or regenerating devices, such as those used in radio-telephonic reception.

Among the objects of the invention is to provide a novel device, preferably as a unitary means, for rendering sounds efficiently and with substantially uniform amplitudes throughout the audible voice and music range of frequencies.

Another object of the invention is to provide such a device with sound producers or sound emitting members, regenerating units having different natural periodicities such that it may be high in the case of the low frequency responsive unit, and be low in the case of the high frequency responsive unit, thereby avoiding marked resonance effects in the output of the device. To arrive at such results, the illustrative embodiment is disclosed with electrical inductances or coils arranged in a filter circuit with one coil responding best to the low frequencies by reason of the high impedance of the inductance, and with another coil responding best to high frequencies by reason of the low impedance thereof. Each coil is designed to actuate a producer and preferably is connected in series with the other coil or coils, such that the inductive reactances may be in inverse ratio to the fundamental frequencies of the sound producers or units.

The invention also may comprehend the shunting of a capacity, such as a condenser, between the reactances or as a by-pass for the high frequency audio current for one or more of the coils, such that the high capacity reactance of the condenser at low frequencies may compel the low frequencies to pass through the other coil or coils, or the coil unit responsive to low frequency current. In this way the response of each unit may be matched to the total response desired to obtain a uniform response at all audible frequencies, the units interacting electrically near or at their respective natural frequencies or periods so that at the frequency when one tends to become resonant, the other is remote from its resonant point. This allows the total circuit to operate with a more uniform load and output, or with an improved power factor.

In a specific illustrative embodiment, the device is in the form of an electro-magnetic unit or structure adapted to operate two sets of sound waves, as by means of a horn and a diaphragm, so interconnected electrically and in series with given inductive reactances in inverse ratio to the fundamental frequencies of the actuated sound producers, as to render the uniformity of final rendition and amplitude thereof, such device also preferably including between the reactances, a capacity shunt for by-passing the high frequencies.

Other objects, features of the invention, capabilities and advantages are comprehended by the invention as will later appear and are inherently possessed thereby.

Referring to the drawings, Fig. 1 is a transverse sectional view through an illustrative embodiment of the invention with certain parts broken or shown in fragments.

Figure 4:
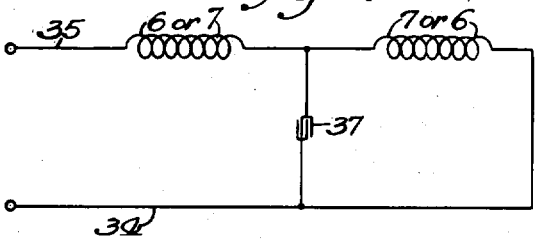

And, Fig. 4 is a diagrammatic view of the circuits that may be used.

Referring now more in details to the drawings, the embodiment selected to illustrate the invention is shown as comprising an electro-magnetic regenerating system having a permanent magnet 1 to the poles 2 and 3 of which are secured polar members or shoes 4 and 5 cooperating with coils or solenoids 6 and 7, an interpolar member 8 being also located between the coils.

Figure 1:
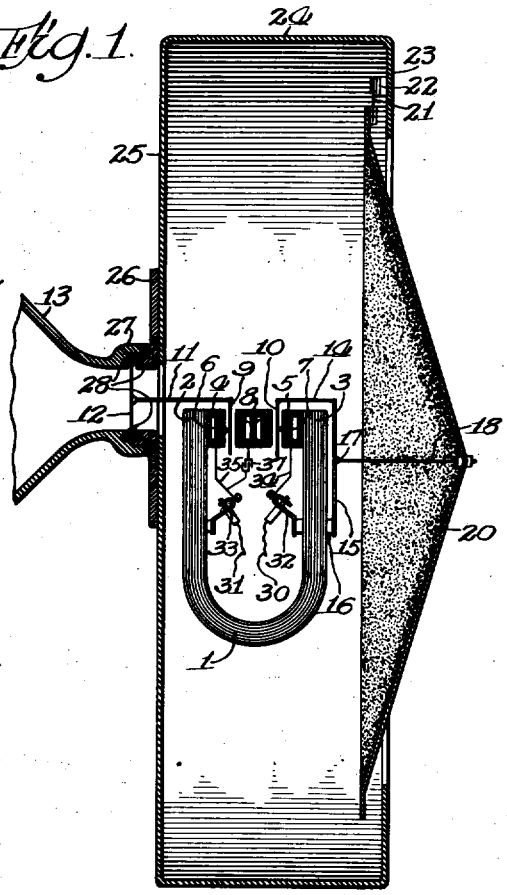

Within the coils 6 and 7 are fulcrumed armatures 9 and 10 with the armature 9 connected at one end thereof to an actuating member or element 11 connected to a vibratable diaphragm 12 of a loud speaker horn 13 as clearly shown in Fig. 1 of the drawings. The outer end of the other armature is connected with an actuating element 14 connected to the end of a vibratable element in the form of a reed 15 connected at its other end to the permanent magnet as indicated at 16 in Fig. 1 of the drawings. The reed 15 has a natural periodicity and at one of its loop points, such as the point 17, is connected an actuating element 18 secured at its outer end to the apex of a cone 20 as clearly shown in the drawings.

The cone is of the free edge type being connected at one or more points by a flexible connector 21 to bosses 22 provided on the inner surface of a rim portion 23 of an end casing member 24, the latter being suitably provided with means for supporting the same upon a support as desired. The member 24 has a side wall 25 to which may be secured a base member 26 of the horn, the latter having a threaded portion 27 secured to a threaded part of the member 26, and provided with suitable grooves with rings 28 for supporting and clamping the margins of the diaphragm 12 as clearly shown in the drawings.

Figure 2:
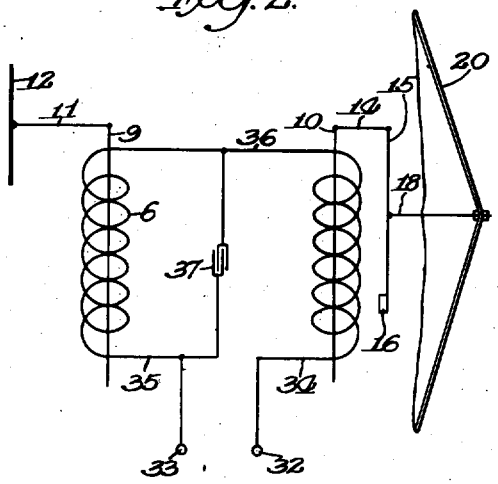
Fig. 2 is a schematic diagram of the power unit.
Figure 3:
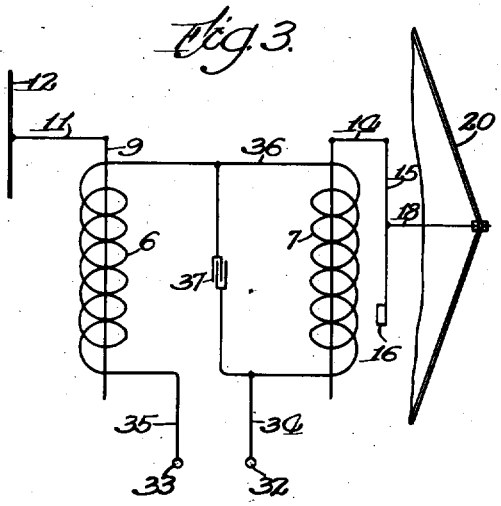
Fig. 3 is a view showing an alternate mode of connecting circuits.

The coils are connected electrically in series through conductors 30 and 31, binding posts 32 and 33 suitably carried by the permanent magnet, and proceeding by leads 34 and 35 to the coils 6 and 7 and an interconnecting lead 36 as clearly shown in Figs. 2 and 3 of the drawings. Where the coils are of such value that it is desired that high frequencies will freely pass through one of the coils, such as the coil 7, a condenser 37 may be connected in shunt with the coil 6 so as to provide a path for the high frequencies without the effect of the same being impressed upon or felt as electro-motive energy in the coil 6, yet the condenser being of such a capacity that frequencies of low value will freely pass through the coil 6 to produce its effect upon the diaphragm 12. If the values of the coils be reversed depending upon the periodicities of the diaphragms 12 and 20, the condenser 37 may be placed in shunt with the coil 7, as clearly shown in Fig. 3, instead of in shunt with the coil 6 as shown in Fig. 2 of the drawings. In this arrangement of the circuit the high frequencies will pass freely through the coil 6 and condenser 37 while the low frequencies will find a free path through the coil 7.

The diagram in Fig. 4 is to diagrammatically show the circuit in simplified form and the coils are alternately representative of coils 6 or 7 and 7 or 6 depending in which way the condenser is connected in shunt with respect to either one of the coils.

While I have herein described and upon the drawings shown an illustrative embodiment of the invention, it is to be understood that it may comprehend other forms, constructions, arrangements of parts and details without departing from the spirit thereof.

Having thus disclosed the invention, I claim:

1. A sound regenerating device, comprising sound producers of different natural periods, and means for actuating said producers and comprising serially connected inductances having reactances in inverse ratio to the fundamental frequencies of the producers affected thereby.

2. A sound regenerating device, comprising sound producers of different natural periods, means for actuating said producers and comprising serially connected inductances having reactances in inverse ratio to the fundamental frequencies of the producers affected thereby, and capacity shunt means for by-passing high frequencies about the inductance high in impedance to said high frequencies.

3. A sound regenerating device, comprising sound producers of different natural periods, means for actuating said producers and comprising an electro-magnetic device for each sound producer, said electro-magnetic devices having reluctances varying inversely with said natural periods of said producers.

4. A sound regenerating device, comprising sound producers of different natural periods, means for actuating said producers and comprising an electro-magnetic device for each sound producer, said electro-magnetic devices having reluctances varying inversely with said natural periods of said producers, and a capacity shunt for one of said electro-magnetic devices.

5. A sound producing device, comprising sound emitting members having different resonance points and a unitary electro-magnetic means comprising serially connected inductances for affecting said members, the reactances of said inductances varying inversely with resonances of said members.

6. A sound producing device, comprising sound emitting members having different resonance points and a unitary electro-magnetic means comprising serially connected inductances for affecting said members, the reactances of said inductances varying inversely with resonances of said members, and a capacity shunt for one of said inductances.

7. A sound regenerating device, comprising sound emitting diaphragmmatic members, an amplifying means for one of said members, an electro-magnetic device for actuating said members and comprising an inductance for each of said members and electrically connected serially, said inductances varying with the resonance characteristics of said members.

8. A sound regenerating device, comprising sound emitting diaphragmmatic members, an amplifying means for one of said members, an electro-magnetic device for actuating said members and comprising an inductance for each of said members and electrically connected serially, said inductances varying with the resonance characteristics of said members, and a capacity shunt for one of said inductances.

In witness whereof, I hereunto subscribe my name to this specification.

PAUL G. ANDRES.